Aug. 8, 1961

S. G. REQUE 2,995,304

ELECTRICAL MULTIPLYING CIRCUIT

Filed Dec. 29, 1954

Inventor:
Styrk G. Reque,
by Howard I. Schlansker
His Attorney.

2,995,304
ELECTRICAL MULTIPLYING CIRCUIT
Styrk G. Reque, Schenectady, N.Y., assignor to General Electric Company, a corporation of New York
Filed Dec. 29, 1954, Ser. No. 478,453
9 Claims. (Cl. 235—194)

This invention relates to electrical computing circuits, and more particularly to a circuit for obtaining an output voltage that is proportional to the product of two D.C. or relatively slowly varying input voltages.

It is well known that the product of two voltages may be obtained by a method of multiplication generally known as the "quarter-square" method. Essentially, that method comprises adding together the two voltages to produce a sum voltage, and subtracting one voltage from the other to obtain a difference voltage. The sum and difference voltages are then each squared, and the difference between the squares is proportional to the desired product of the two voltages.

In order to square the sum and difference voltages by relatively simple electronic means, it has been found desirable first to add the sum and difference voltages to an alternating current carrier voltage having a triangular waveform. Thus, if the two voltages whose product is to be obtained are designated as X and Y and the peak amplitude of the triangular wave as C, then a peak voltage $E_1$ representing the sum of these voltages may be written as (1) $$E_1 = X + Y + C$$

Similarly, a peak voltage $E_2$ representing the difference between the voltages X and Y when added to the triangular wave may be expressed as (2) $$E_2 = X - Y + C$$

It is well known that, when a triangular waveform consisting of an A.-C. wave imposed upon one or more D.C. bias voltages is rectified, the average value of the rectified voltage is proportional to the square of the peak voltage of the waveform. Thus, a voltage $E_3$ resulting from rectification of $E_1$ may be written as (3) $$E_3 = k(X + Y + C)^2 = k(X^2 + 2XY + 2XC + Y^2 + 2YC + C^2)$$

and a voltage $E_4$ resulting from rectification of $E_2$ may be written as (4) $$E_4 = k(X - Y + C)^2 = k(X^2 - 2XY + 2XC + Y^2 - 2YC + C^2)$$

where $k$ is a proportionality constant. If now the voltage $E_4$ is subtracted from the voltage $E_3$, it is found that the difference voltage $E_5$ is equal to (5) $$E_5 = E_3 - E_4 = k(4XY + 4YC)$$

Therefore, if a voltage equal to the term $4kCY$ is subtracted from the voltage $E_5$, it is apparent that the remaining voltage is proportional to the desired product of X and Y.

It is an object of the present invention to provide a multiplying circuit based on the quarter-square method of multiplication, which is characterized by simplicity of circuitry.

Another object of the invention is to provide such a circuit in which the carrier wave need not traverse components that may distort the wave shape because of limited frequency response. Thus, the carrier may be of any desired frequency.

One circuit constructed in accordance with the invention comprises means for obtaining the sum of the two voltages whose product is desired, and means for obtaining the difference between the two voltages. Means are provided for adding the sum and difference voltages to a cyclically recurring carrier voltage to produce first and second voltages corresponding to those of Equations 1 and 2. The circuit includes means for half-wave rectifying these voltages to produce third and fourth voltages corresponding to those of Equations 3 and 4 that are proportional to the average values of the squares of the first and second voltages, means for obtaining the difference voltage between these average values, and means for removing unwanted components from the difference voltage to provide an output voltage proportional to the product of the input voltages.

The circuit of the invention has the special advantage that the carrier voltage may be added to the sum and difference voltages at the same time the sum and difference voltages are developed, or it may be added to them at a later time. Thus, if the components used to obtain the sum and difference voltages have limited frequency response, the carrier may be added after the sum and difference signals are obtained, without fear that the carrier waveform may be distorted. The carrier may be of any desired frequency.

Another feature of the invention is that when the first and second voltages are half-wave rectified corresponding portions of the two voltage waves are eliminated. Therefore, many irregularities in the waveforms are cancelled when the fourth voltage is subtracted from the third voltage.

The novel features which are believed to be characteristic of the invention are set forth with particularity in the appended claims. The invention itself, however, both as to its organization and method of operation, together with further objects and advantages thereof, may best be understood by reference to the following description taken in connection wtih the accompanying drawing, ir which:

Figure 1:
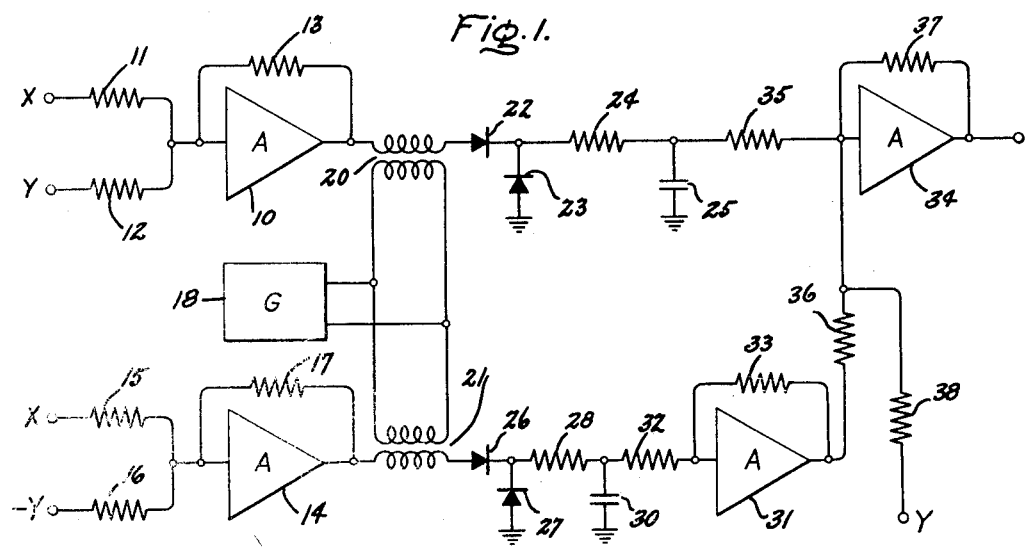
FIG. 1 is a block diagram of a multiplying circuit constructed in accordance with the invention.

Referring to FIG. 1 of the drawing, which shows one embodiment of the invention for obtaining a voltage proportional to the product of two voltages X and Y, it is seen that the circuit may be divided into two channels, for purposes of explanation. The upper channel serves to add together the X and Y input signals, and comprises an amplifier 10 into which the X and Y input signals are connected in parallel through similar resistors 11 and 12, respectively. The amplifier 10 is provided with a feedback resistor 13 of the same value as resistors 11 and 12.

It is assumed that the X and Y input signals are D.C. or relatively slowly varying voltages. Therefore, the amplifier 10 may be of the conventional type known as a D.C. summing amplifier. Amplifiers of that type are discussed and various circuits illustrated in chapter V of a book entitled "Electronic Analog Computers" by Korn and Korn (McGraw-Hill, 1952). It is well known in the computer art that if a feedback resistor is connected across a summing amplifier from output to input, an input signal to the amplifier will in effect be multiplied by the ratio of the resistance of the feedback resistor to the resistance of the input resistor through which the signal is connected into the amplifier. In the present case, where the resistors 11, 12 and 13 are of equal size, the amplifier has unity gain for both the X and Y signals and serves merely to add together and invert the signals to produce a voltage equal to $-(X+Y)$.

The lower channel of the circuit serves to add together the X input signal and a $-Y$ input signal. This channel includes a D.C. summing amplifier 14 similar to the amplifier 10, and the X and −Y signals are connected to its input in parallel through similar resistors 15 and 16, respectively. The amplifier 14 is provided with a feedback resistor 17 of the same value as resistors 15 and 16, so that the output of the amplifier is a voltage equal to $-(X-Y)$.

The −Y signal may be produced from the Y signal by conventional means (not shown). For example, a D.C. summing amplifier similar to the amplifiers 10 and 14 having unity gain may be provided merely to invert the Y signal to provide the −Y signal for connection into the lower channel of the circuit. Of course, means other than an inverting amplifier may be used for this purpose.

The outputs of the amplifiers 10 and 14 are added to a periodically recurring carrier wave, which is produced by a generator 18. The output of the generator 18 energizes the primary windings of transformers 20 and 21, the secondary winding of transformer 20 being connected into the output circuit of amplifier 10 and the secondary winding of transformer 21 being connected into the output circuit of amplifier 14. Thus, the signal present in the upper channel of the circuit after the carrier is introduced is equal to $(-X-Y+C)$, and the signal present in the lower channel of the circuit after the carrier is introduced is equal to $(-X+Y+C)$, where C is the peak amplitude of the periodically recurring carrier voltage coupled into the outputs of the amplifiers. It is apparent that these signals correspond to those set forth above in Equations 1 and 2. The fact that the X and Y signals present in the upper and lower channels are of opposite polarity from those shown in Equations 1 and 2 is of no concern. Such a condition is common in the computer art, as is well known. The output voltage of the carrier generator 18 preferably has a triangular waveform with peak amplitude larger than the greatest value attainable by the sum of the X and Y signals in either polarity. The frequency of the triangular carrier voltage should be substantially greater than the frequency of any variations of the X and Y signals, but there are no other requirements as to carrier frequency. If desired, the output of the generator may be a sine wave, subject to the same amplitude and frequency requirements as a triangular wave. However, as will be later pointed out in more detail, the output of the circuit when using a sine wave carrier will not be strictly proportional to the product of the input voltages. For many purposes, such a good approximation is acceptable, but for other purposes it may be found necessary to use a true triangular waveform.

It is one of the outstanding features of the present invention that the high frequency carrier may be injected into the circuit at a point such that it is not required to traverse components that may have limited frequency response. Because of this feature, the amplifiers 10 and 14 may be conventional direct current computing amplifiers and no concern need be given to their high frequency response.

Looking again at the upper channel of the circuit, it is seen that the voltage representing the sum $$(-X-Y+C)$$

is half-wave rectified by rectifier elements 22 and 23, which are connected to remove the negative portion of the triangular waveform, biased by the signal voltages X and Y. The rectifier elements 22 and 23 are illustrated as dry rectifiers such as the copper oxide or selenium types. As will be later explained in detail, when a voltage having triangular waveform of peak amplitude C biased by direct current voltages X and Y is half-wave rectified, the average value of the output voltage of the rectifying means is proportional to the square of the voltage $(-X-Y+C)$, or, in this case, is equal to $$k(-X-Y+C)^2$$

where $k$ is a proportionality constant. Thus, the output of the rectifiers corresponds to the voltage of Equation 3, with X and Y of opposite polarity. The combination of a resistor 24 and capacitor 25 will provide a steady output voltage having an amplitude equal to the average value of the output voltage of rectifying elements 22 and 23. In one mode of operating this resistor-capacitor combination, the resistance of resistor 24 is substantially greater than the back resistance of rectifier element 23.

A similar arrangement is provided in the lower channel of the circuit by means of which the signal present in the output circuit of amplifier 14 after introduction of the carrier signal is half-wave rectified by rectifiers 26 and 27, which remove the negative portion of that signal, and their output is averaged by the combination of a resistor 28 and capacitor 30. The output of the rectifying means in the lower circuit is a voltage equal to $k(-X+Y+C)^2$, which corresponds to the voltage of Equation 4 with X and Y of opposite polarity. This voltage is then inverted by a D.C. amplifier 31, similar to the amplifiers 10 and 14 previously described, into which the signal is connected through an input resistor 32. The amplifier 31 is provided with a feedback resistor 33 equal in value to the combined values of resistors 28 and 32, so that the amplifier merely inverts the input signal with unity gain. Thus, the signal present at the output of the amplifier may be expressed as $-k(-X+Y+C)^2$.

It is now apparent from Equation 5 that if the voltages of opposite polarity present at the output of the rectifiers in the upper channel and at the output of the amplifier 31 in the lower channel are added together, the resulting sum will contain a term proportional to the desired product of X and Y. The summation is performed by a D.-C. amplifier 34 similar to the amplifiers previously described. The signal present at the output of the rectifiers in the upper channel is connected into the amplifier 34 through an input resistor 35, and the output of the amplifier 31 in the lower channel is similarly connected to the input of the amplifier 34 through a resistor 36. The amplifier 34 is provided with a feedback resistor 37 equal in value to the input resistor 36 in the lower channel and to the combined values of resistors 24 and 35 in the upper channel. Thus, the amplifier 34 functions to add together the two input signals with unity gain and invert their sum to produce a voltage $(-4kXY+4kYC)$.

The Y input signal is also connected to the input of the summing amplifier 34 through an input resistor 38 equal in value to feedback resistor 37. The Y signal is inverted by the amplifier and serves to cancel the undesired term $4kYC$ in the output of the amplifier 34, so that the output signal is equal to $-4kXY$, which is the desired product.

Figure 2:
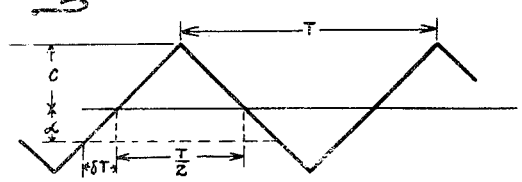
FIG. 2 is a waveform diagram useful in understanding the operation of the circuit of the invention.

A better understanding of the invention and particularly the operation of the rectifying means and final summing amplifier may be obtained from a consideration of the mathematical aspects of the circuit. FIG. 2 illustrates a triangular waveform, such as the carrier wave introduced into the upper and lower channels, superimposed upon a D.-C. bias. The triangular wave has a peak amplitude C, a period T, and the D.-C. bias is designated as $\alpha$. The increase in area $\Delta A$ under the curve due to the D.-C. bias may be expressed as (6) $$\Delta A = \frac{T}{2}\alpha + \delta T \cdot \alpha$$

where $\delta T$ is the increase in time that the voltage is positive due to the D.-C. bias. $\delta T$ may be expressed in terms of the slope of the waveform as (7) $$\delta T = \alpha \cdot \frac{T}{4C}$$

Thus, substituting Equation 7 into Equation 6, (8) $$\Delta A = \frac{T}{2} \cdot \alpha + \frac{T}{4C} \cdot \alpha^2$$

which expressed in average values becomes (9) $$\overline{\Delta A} = \frac{\alpha}{2} + \frac{\alpha^2}{4C}$$

Now in the upper channel of the circuit, the term $\alpha$ equals $(X+Y)$, while in the lower channel $\alpha$ equals $(X-Y)$. Therefore, two equations may be written in the form of Equation 9 to express the increases in areas $\overline{\Delta A_1}$ and $\overline{\Delta A_2}$ under the curves of the upper and lower channels, respectively, as

(10) $$\overline{\Delta A_1} = \frac{X+Y}{2} + \frac{(X+Y)^2}{4C}$$

and

(11) $$\overline{\Delta A_2} = \frac{X-Y}{2} + \frac{(X-Y)^2}{4C}$$

If now the equations are expanded and Equation 11 subtracted from Equation 10, the difference is

(12) $$\overline{\Delta A_1} - \overline{\Delta A_2} = Y + \frac{XY}{C}$$

The rectifiers of the upper and lower channels acting in conjunction with the final summing amplifier 34 (FIG. 1) serve in effect to provide voltages analogous to the geometric quantities shown in FIG. 2 and set forth in Equations 10–12. It is noted in Equation 5 that $$E_5 = 4kXY + 4kYC$$

where $k$ is a proportionality constant. It may easily be shown by a method similar to the one used above in describing FIG. 2 that the proportionality constant $k$ is equal to $$\frac{1}{4C}$$

Substituting that value of $k$ into Equation 5, it is seen that

(13) $$E_5 = \frac{XY}{C} + Y$$

In the present case where the negative rather than the positive sum and difference of X and Y are added to the carrier, the output of the final summing amplifier 34, when only the signals in the upper and lower channels are connected to its input, is equal to $$\left(-\frac{XY}{C} + Y\right)$$

Therefore, as previously explained, a $+Y$ signal is also connected into the amplifier 34. The Y signal is inverted by the amplifier and cancels the $+Y$ output term, so that the amplifier output voltage is equal to $$-\frac{XY}{C}$$

which is proportional to the desired quantity.

It is apparent from a study of FIG. 2 that the use of a sine wave carrier rather than a triangular wave carrier will result in a close approximation of the desired product. That is, the portion of the sine wave that moves upwardly or downwardly across the base line as the bias voltage X and Y vary is almost a straight line, and it is only the departure of that area of the curve from a straight line that introduces error into the output. The mathematical analysis made with reference to FIG. 2 also shows that the carrier need not have an isosceles triangle form, but may be of any desired or readily available triangular shape, and the output will be completely accurate.

One of the outstanding features of the invention is that when the signals in the upper and lower channels are half-wave rectified, corresponding portions of the triangular waveform are eliminated from both channels. Thus, any irregularities occuring in the triangular waveform produced by the generator 18 are automatically cancelled when the voltages are subtracted in the final step of the multiplication process. This would not be true if, for example, the lower portion of the wave were eliminated in one channel and the upper portion of the wave eliminated in the other channel.

Figure 3:
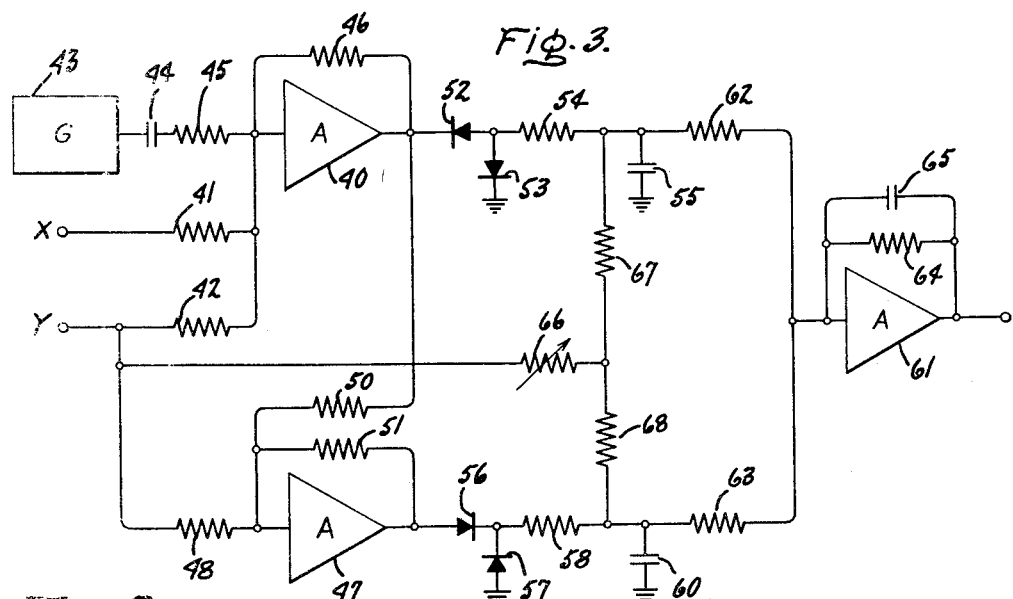
FIG. 3 is a block diagram of a modification of the circuit.

FIG. 3 illustrates a modification of the circuit of the invention in which the need for a separate $-Y$ signal is eliminated. The X and Y input signals are connected into a D.-C. amplifier 40 through input resistors 41 and 42, and a carrier wave of triangular or sinusoidal waveform is also connected into the amplifier from a generator 43 through a capacitor 44 and input resistor 45. The amplifier 40 is provided with a feedback resistor 46 equal in value to the resistors 41, 42 and 45 so that the output of the amplifier equals the negative sum of the input voltages; that is, the amplifier output voltage equals $$-(X+Y+C)$$

The amplifier 40 is of conventional D.-C. type similar to those described with reference to FIG. 1.

Although the carrier wave generator 43 is illustrated as having its output connected to the input of the summing amplifier 40, it is to be understood that the carrier signal may be coupled into the system in the same manner as shown in FIG. 1. The carrier wave may be of triangular or sinusoidal form as previously explained.

The Y signal is also connected to the input of a conventional D.C. summing amplifier 47 in the lower channel of the circuit through an input resistor 48, and the output of the amplifier 40 in the upper channel is connected to the input of the amplifier 47 in the lower channel through a resistor 50. A feedback resistor 51 is provided for the amplifier 47, which is equal in value to the resistor 50 and twice the value of the Y input resistor 48. Thus, the amplifier 47 serves to multiply the Y input signal by two, add it to the output signal $-(X+Y+C)$ of the amplifier 40 and invert the sum. Thus, the signal present at the output of the amplifier 47 is equal to $(X-Y+C)$.

The output of the amplifier 40 is rectified by the rectifiers 52 and 53 and averaged by resistor 54 and capacitor 55 to provide a signal $-k(X+Y+C)^2$, in the same manner as previously described with reference to FIG. 1. The output of the amplifier 47 is similarly rectified by the rectifiers 56 and 57 and averaged by resistor 58 and capacitor 60 to provide a signal $k(X-Y+C)^2$. It is again pointed out that corresponding portions of the signals present in the upper and lower portions of the circuit are eliminated by the half-wave rectification process. The rectifiers 52 and 53 in the upper channel are connected in opposite polarity from the rectifiers 56 and 57 in the lower channel. This is necessary when eliminating corresponding portions of the carrier wave in both channels because the carrier wave in the upper channel has been inverted once, while the carrier wave in the lower channel has been inverted twice.

The output signals from the rectifiers are coupled to the input of a final D.C. summing amplifier 61 through an input resistor 62 in the upper channel and input resistor 63 in the lower channel. The amplifier 61 is provided with a feedback resistor 64 equal in value to the combination of resistors 54 and 62 and the combination of resistors 58 and 63. A capacitor 65 across the resistor 64 provides filtering for any high frequency carrier wave component that may not have been removed by the filters previously described. The amplifier 61 functions to add and invert the input signals $-k(X+Y+C)^2$ and $k(X-Y+C)^2$ and, if these were the only input signals, provide an output equal to $(4kXY + 4kYC)$.

As previously shown, the proportionality constant $k$ is equal to $$\frac{1}{4C}$$

so the output from the amplifier would be equal to $$\left(\frac{XY}{C}+Y\right)$$

In order to eliminate the unwanted Y signal present in the output of the amplifier 61, the Y input signal is coupled into the amplifier 61 through a variable resistor 66, and fixed resistors 67 and 68. The value of resistor 66 is chosen so that this resistor in series with the parallel combination of resistors 67, 62, 68, and 63 provides a resistance that is equal to the feedback resistor 64. Thus, amplifier 61 inverts the Y signal and adds it to the other input signals to provide an output signal equal to $$\frac{XY}{C}$$

Although both circuits of the invention have been described as embodying amplifiers having unity gain (with the exception of amplifier 47 for the Y input signal), it is obvious that this need not necessarily be the case. In accordance with the usual computer design techniques, the amplifier gains may be varied for various scale factors or to utilize the rectifiers or amplifiers at optimum levels.

While particular embodiments of the invention have been illustrated, it will of course be understood that the invention is not limited thereto, since various modifications both in the circuit arrangement and in the instrumentalities employed may be made. It is contemplated by the appended claims to cover any such modifications as fall within the true spirit and scope of the invention.

What I claim as new and desire to secure by Letters Patent of the United States is:

1. In apparatus for obtaining a voltage proportional to the product of two input voltages, the combination of means for obtaining a voltage proportional to the sum of said input voltages, means for obtaining a voltage proportional to the difference of said input voltages, means for adding a cylically recurring voltage wave to said sum and difference proportional voltages to produce third and fourth voltages, first squaring means for providing an output voltage proportional to the square of said third voltage, second squaring means for providing an output voltage proportional to the square of said fourth voltage, first averaging means to provide a steady output voltage having an amplitude proportional to the average value of said first squaring means output voltage, second averaging means to provide a steady output voltage having an amplitude proportional to the average value of said second squaring means output voltage, and means for obtaining a voltage proportional to the difference between said first and second averaging means output voltages.

2. In apparatus for obtaining a voltage proportional to the product of two input voltages, the combination of means for obtaining a voltage proportional to the sum of said input voltages, means for obtaining a voltage proportional to the difference of said input voltages, means for adding a cyclically recurring voltage wave to said sum and difference proportional voltages to produce third and fourth voltages, first rectifying means for half-wave rectifying said third voltage, second rectifying means for half-wave rectifying said fourth voltage, first averaging means to provide a steady output voltage having an amplitude proportional to the average value of the half-wave rectified voltage delivered by said first rectifying means, second averaging means to provide a steady output voltage having an amplitude proportional to the average value of the half-wave rectified voltage delivered by said second rectifying means, and means for obtaining a voltage proportional to the difference between said first and second averaging means output voltages.

3. Apparatus for obtaining a voltage proportional to the product of two input voltages comprising means for obtaining a voltage proportional to the sum of said input voltages, means for obtaining a voltage proportional to the difference of said input voltages, means for adding a cyclically recurring voltage wave to said sum and difference proportional voltages to produce third and fourth voltages, first squaring means for providing an output voltage proportional to the square of said third voltage, second squaring means for providing an output voltage proportional to the square of said fourth voltage, first averaging means to provide a steady output voltage having an amplitude proportional to the average value of said first squaring means output voltage, second averaging means to provide a steady output voltage having an amplitude proportional to the average value of said second squaring means output voltage, means for obtaining a voltage proportional to the difference between said first and second averaging means output voltages, and means for inverting and adding to said difference proportional voltage the input signal that is subtracted from the other input signal in said difference voltage obtaining means.

4. In apparatus for obtaining a voltage proportional to the product of two input voltages, the combination of means for summing said input voltages, means for subtracting one of said input voltages from the other, means for adding a cyclically recurring voltage wave to the output of said summing means to produce a second voltage wave, means for adding said cyclically recurring voltage wave to the output of said subtracting means to produce a third voltage wave, means for half-wave rectifying and averaging each of said second and third voltage waves, said rectifying means acting to eliminate corresponding portions of said second and third voltage waves, and means for obtaining the difference between said rectified voltage waves.

5. In apparatus for obtaining a voltage proportional to the product of two input voltages, the combination of means for adding together and inverting said input voltages to obtain a voltage proportional to the inverted sum, means for subtracting one of said input voltages from the other and inverting to obtain a voltage proportional to the inverted difference, means for adding to said sum and difference proportional voltages a cyclically recurring voltage to produce third and fourth voltages respectively, means for half-wave rectifying and averaging each of said third and fourth voltages to produce fifth and sixth voltages respectively, means for inverting said sixth voltage, and means for adding said fifth voltage and said inverted sixth voltage to obtain a voltage proportional to their sum.

6. In apparatus for obtaining a voltage proportional to the product of two input voltages, the combination of means for adding together and inverting said input voltages to obtain a first voltage proportional to the inverted sum, means for subtracting one of said input voltages from the other and inverting to obtain a second voltage proportional to the inverted difference, means for adding to said first and second voltages a cyclically recurring voltage wave to produce third and fourth voltage waves respectively, means for half-wave rectifying and averaging each of said third and fourth voltage waves to produce fifth and sixth voltages respectively, said rectifying means acting to eliminate corresponding portions of said third and fourth voltage waves, means for inverting said sixth voltage, and means for adding said fifth voltage and said inverted sixth voltage to obtain a voltage proportional to their sum.

7. Apparatus for obtaining a voltage proportional to the product of two input voltages comprising means for adding together and inverting said input voltages to obtain a voltage proportional to the inverted sum, means for subtracting one of said input voltages from the other and inverting to obtain a voltage proportional to the inverted difference, means for adding to said sum and difference proportional voltages a cyclically recurring voltage to produce third and fourth voltages respectively, means for half-wave rectifying and averaging each of said third and fourth voltages to produce fifth and sixth voltages respectively, means for inverting said sixth voltage, means for adding said fifth voltage to said inverted sixth voltage and inverting to produce a voltage proportional to the inverted sum, and means for inverting and adding to said last-mentioned inverted sum the input signal that is subtracted from the other input signal by said subtracting means.

8. Apparatus for obtaining a signal proportional to the product of two input signals, comprising: two circuit channels, means in one of said channels for obtaining a first signal proportional to the sum of said signals and a cyclically recurring signal, means in the other one of said channels for obtaining a second signal proportional to the sum of said cyclically recurring signal and the difference between said input signals, means for producing third and fourth signals respectively proportional to the squares of said first and second signals, means for obtaining a fifth signal proportional to the difference between the average values of said third and fourth signals, whereby said fifth signal contains a component proportional to one of said input signals, and means for removing said component from said fifth signal.

9. Apparatus for obtaining a signal proportional to the product of two input signals, comprising: two circuit channels, means in one of said channels for obtaining a first signal proportional to the sum of said signals and a cyclically recurring signal, means in the other one of said channels for obtaining a second signal proportional to the sum of said cyclically recurring signal and the difference between said input signals, means for half-wave rectifying each of said first and second signals to produce respective third and fourth signals, means for obtaining a fifth signal proportional to the difference between the average values of said third and fourth signals, whereby said fifth signal contains a component proportional to one of said input signals, and means for removing said component from said fifth signal.

References Cited in the file of this patent

UNITED STATES PATENTS 2,674,409     Lakatos _____ Apr. 6, 1954

OTHER REFERENCES

"A Simple Electronic Multiplier" (Norsworthy), Electronic Engineering, Number 26, pp. 72–75, February 1954.

"An Analog Multiplier Using Thyrite" (Kovoch and Comley), I.R.E. Transactions-Electronic Computers, vol. EC3, No. 2, pp. 44–45, June 1954.

"A New Electronic Multiplication Method Involving Only Simple Conventional Circuits" (Mills), Technical Report No. 680 (00)–4, Magnolia Petroleum Company Field Research Laboratories, Dallas, Texas (Nov. 9, 1953), FIG. 5 relied on.